United States Patent [19]
Madden

[11] 3,918,667
[45] Nov. 11, 1975

[54] MOUNTING FOR PIPES AND CONDUITS IN STUDS AND JOISTS

[76] Inventor: James E. Madden, 14826 Skylind Blvd. Apt. 4, Woodside, Calif. 94062

[22] Filed: Oct. 18, 1973

[21] Appl. No.: 407,534

[52] U.S. Cl. .................. 248/56; 16/2; 248/74 PB; 248/300
[51] Int. Cl.² ........................................... F16L 5/00
[58] Field of Search ......... 248/56, 57, 74 PB, 74 B, 248/74 A, 300; 16/2; 174/65 G, 152 G, 153 G; 403/347; 137/360, 362

[56] References Cited
UNITED STATES PATENTS

| | | | |
|---|---|---|---|
| 973,568 | 10/1910 | Russell | 16/2 UX |
| 1,062,635 | 5/1913 | Clements | 16/2 |
| 1,094,990 | 4/1914 | Havens | 174/152 G X |
| 1,809,864 | 6/1931 | Pearson | 16/2 |
| 2,420,826 | 5/1947 | Irrgang | 16/2 X |
| 2,952,730 | 9/1960 | Simonds | 174/153 G |
| 3,034,185 | 5/1962 | Olsen | 248/56 X |
| 3,229,026 | 1/1966 | Sulzer | 16/2 X |
| 3,366,356 | 1/1968 | Fisher | 248/56 |
| 3,481,571 | 12/1969 | Lauckner | 248/57 |
| 3,634,608 | 1/1972 | Buhl et al. | 248/56 X |
| 3,684,220 | 8/1972 | Logsdon | 248/56 |

FOREIGN PATENTS OR APPLICATIONS

| | | | |
|---|---|---|---|
| 303,406 | 8/1968 | Sweden | 248/56 |
| 550,936 | 2/1943 | United Kingdom | 174/153 G |

*Primary Examiner*—Roy D. Frazier
*Assistant Examiner*—Rodney H. Bonck
*Attorney, Agent, or Firm*—Julian Caplan

[57] ABSTRACT

A notch slightly larger than the diameter of the pipe or conduit is cut into the edge of a stud or joist. The pipe or conduit is then installed, fitting into the notch. A sheet metal reinforcement which is right angle in cross-section and is formed with a slot in one flange is nailed to the stud or joist with the pipe fitting into the slot. A split plastic sleeve is then slipped over the pipe and moved axially so that it fits around the pipe and into the slot and notch. The sleeve has a flange which fits outside the reinforcement and preferably has lugs fitting into notches in the reinforcement to position the flange so that a chordal edge is aligned with the edge of the stud.

2 Claims, 7 Drawing Figures

MOUNTING FOR PIPES AND CONDUITS IN STUDS AND JOISTS

This invention relates to a new and improved mounting for pipes and conduits in studs and joints. It will be understood that the invention has application in the installation of water and gas pipes and electrical conduits, all of which are hereinafter referred to as pipes, and that the same may be installed in studs and joists of either wood or metal, all of which are hereinafter referred to as studs.

The principal purpose of the invention is to mount a pipe extending through a stud accurately and securely in place. The mounting of the present invention reduces the labor required and is an improvement over conventional mountings wherein holes are drilled through the stud and the pipe is inserted by snaking it through the series of studs of a wall.

One of the principal advantages of the present invention is the fact that it is not necessary to drill through the stud but merely to cut a notch in the wall edge thereof by means of a saw. Further, the pipe is installed in a series of notches in adjacent studs merely by inserting them into the notches rather than snaking the pipe into the holes from the side.

Another feature of the invention is the provision of a sheet metal reinforcement which is nailed to the stud surrounding the notch cut therein and restrengthens the stud so that the strength of the material cut away is replaced.

Another feature of the invention is the fact that the sheet metal reinforcement protects the pipe from nails driven into the studs.

Another feature of the invention is the fact that it may be used either in connection with wood or metal studs as required.

Still another feature of the invention is the provision of a plastic sleeve which fits around the pipe and occupies most of the space between the pipe and the reinforcement or the walls of the notch in the stud and reduces vibration and controls grounding.

Other objects of the present invention will become apparent upon reading the following specification and referring to the accompanying drawings in which similar characters of reference represent corresponding parts in each of the several views.

Figure 1:
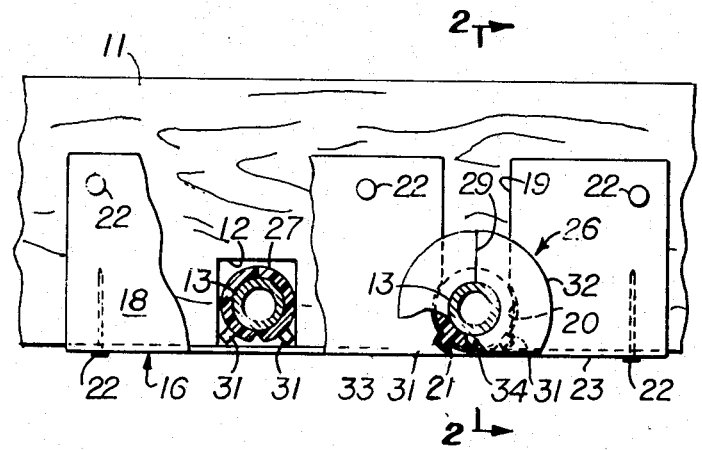
FIG. 1 is a side elevational view of a stud in which the present invention is installed partly broken away to reveal internal construction.
Figure 2:
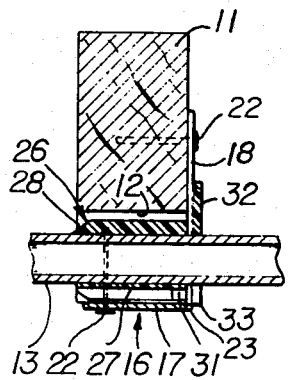
FIG. 2 is a sectional view taken substantially along the line 2—2 of FIG. 1.
Figure 4:
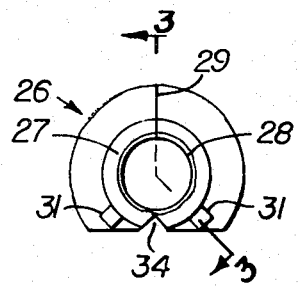
FIG. 4 is an end elevation as viewed from the right of FIG. 3.
Figure 3:
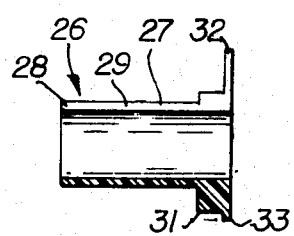
FIG. 3 is a side elevational view of a sleeve in accordance with the present invention.

The invention is adapted for installation in a stud 11 here shown to be of wood, it being understood that the member may be a joist and may be constructed of either wood or metal. A preferably square notch 12 is cut into the wall edge of stud 11 being of a dimension slightly greater than the diameter of the pipe or conduit (hereinafter referred to as "pipe") 13 to be installed. A plurality of notches 12 may be cut into stud 11. Since the notch 12 is cut into the room side of the stud 11 and of all adjacent studs, the pipe 13 need merely be placed in the notches 12 rather than being snaked into the holes ordinarily drilled into studs 11 in accordance with prior practice.

With the pipe 13 in place, a sheet metal reinforcement 16 is installed on the stud 11. Reinforcement 16 is L-shaped in cross section and has a front flange which fits over the room side of stud 11 and a side flange 18 which fits over one side of stud 11, the latter being formed with a slot 19 extending from the back edge thereof to the front and being of a width equal to the width of notch 12. Slot 19 is preferably keyhole-shaped, formed with enlargement 20 at its end closest to the corner 23 where flanges 17 and 18 joins. As an optional feature, notches 21 may be cut into side flange 18 beyond the side edges of slot 19 for the purpose of locating sleeve 26, as hereinafter explained. Nails 22 are driven through appropriate holes in reinforcement 16 to securely fasten the same to the stud 11, and when thus located the reinforcement 16 restrengthens the stud 11 to compensate for the material cut away in forming the notch 12. It will be understood that a plurality of pipes 13 may be installed adjacent each other; and for such purpose, the reinforcement 16 is formed with a plurality of slots 19 appropriately spaced apart.

Figure 5:
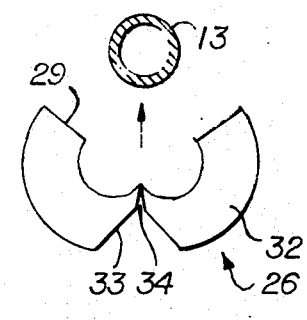
FIG. 5 is an end elevation as viewed from the left of FIG. 3 showing the sleeve distended ready for installation over a pipe.

For each pipe 13 passing through each stud 11, a sleeve 26 is employed. Sleeve 26 has a cylindrical portion 27 having an inside diameter such as to enable it to slip over the outside diameter of pipe 13 and having an outside diameter less than the dimensions of notch 12 or enlargement 20 of slot 19. One end of cylindrical portion 27 is formed with a chamfer 28 to assist in installing the sleeve 26 as hereinafter appears. Further, the sleeve 26 is formed with a split 29 extending longitudinally throughout the entire length thereof to enable it to be distended as shown in FIG. 5. Where notches 21 have been formed in reinforcement 16, ears 31 which fit into the notches 21 are preferably formed on the exterior of cylindrical portion 27. At the end of cylindrical portion 27 opposite chamfer 28 is a peripheral flange 32. A chordal line of truncation 33 is formed on flange 32 so that when the mounting is completely installed the line 33 coincides with the front flange 17. To assist in distending the cylinder 26, a notch 34 extending longitudinally opposite split 29 is formed.

In the use of the device, as has been stated, the notch 12 is cut into the stud 11 and the pipe 13 installed. Thereupon, the reinforcement 16 is installed and held in place by nails 22. Thereupon, the sleeve 26 is distended as shown in FIG. 5 and slipped over the pipe 13. It is thereupon pushed axially so that the chamfer 28 enters enlargement 20 and then notch 12 and the flange 32 then rests flush against the flange 18. The truncation line 33 is as shown in FIG. 1. The ears 31 and notches 21 when used assist in holding the sleeve 26 securely in place. The sleeve 26 protects the pipe 13 from any contact with the sheet metal reinforcement 16 thereby reducing vibration or electrical ground.

Figure 7:
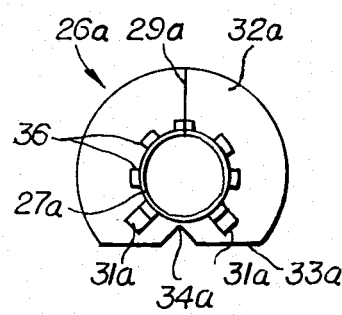
FIG. 7 is a view similar to FIG. 4 of the modification of FIG. 6.
Figure 6:
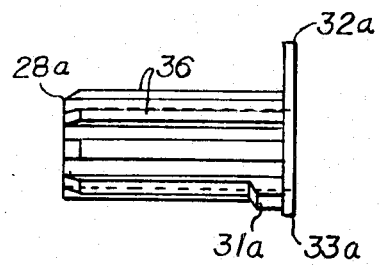
FIG. 6 is a view similar to FIG. 3 of a modification.

FIGS. 6 and 7 show a modified version wherein the thickness of cylindrical portion 27 is less than in the preceding modification but strength is obtained by means of splines 36 on the exterior of the cylindrical portion 27. In other respects, the modification of FIGS. 6 and 7 is similar to that of the preceding modification and the same reference numerals followed by subscript *a* are used to designate corresponding elements.

What is claimed is:

1. For use in mounting a pipe extending through a notch in a stud, in combination, a sheet metal reinforcement of L-shape cross-section having a first and a second flange disposed at right angles to each other and joining at a corner, said first flange formed with a slot extending from its outer edge to said corner, said slot having a keyhole-shape enlargement at said corner and notches formed in said first flange at said keyhole-shape enlargement, both said flanges being formed with holes for fastening means to attach said reinforcement to a stud, and a sleeve comprising a cylindrical portion having an outside diameter less than that of said keyhole enlargement and greater than the width of said slot remote from said keyhole enlargement and having a peripheral flange at one end, said cylindrical portion and said peripheral flange formed with a slit to permit said sleeve to be distended and slipped over a pipe prior to assembly of said combination and then moved axially into assembled position with said peripheral flange in contact with said first flange and said cylindrical portion extending from said first flange on the same side of said first flange as said second flange, said sleeve being formed with ears complementary to said notches to locate said sleeve relative to said reinforcement and to restrain movement of said sleeve relative to said reinforcement after assembly, said peripheral flange being truncated at a chordal line aligned with said second flange.

2. The combination of claim 1 in which said cylindrical portion is thin-walled and formed with external longitudinal reinforcing splines.

* * * * *